Patented Jan. 26, 1943

2,309,185

UNITED STATES PATENT OFFICE 2,309,185

WATERPROOF SEALING COMPOUND

Philip L. Gordon, New York, N. Y.

No Drawing. Application December 5, 1940,
Serial No. 368,626

3 Claims. (Cl. 260—738)

This invention relates to the composition of a waterproof sealing compound.

More specifically, this invention relates to the composition of a plastic compound which will adhere to wet solid surfaces, for the purpose of sealing leakage of water, even when small hydrostatic pressures exist. The object of this invention is to provide a water resistant material which can be used to repair piping or water containers, such as aquariums, where it is inconvenient or impossible to remove the water and obtain dry conditions for repair.

This plastic compound consists of the following components:

(A) *Binder.*—The binder should be a water resistant material which is capable of releasing all of its solvent even in a thick layer to form a tough, flexible film, with the aid of a suitable plasticizer. It should be nontoxic, and preferably noninflammable. Chlorinated rubber is a very effective binder for the purpose.

(B) *Solvent.*—The solvent should be capable of forming a clear solution of the binder, have a high rate of evaporation, and should preferably be noninflammable. Carbon tetrachloride, ethylene dichloride, or mixtures of the two are satisfactory examples.

(C) *Plasticizer.*—The plasticizer serves to provide the desired amount of flexibility in the dried plastic, and also increases the adhesive properties of the plastic compound. The plasticizer should be nontoxic, have low volatility and good resistance to water, and must be compatible with the binder and the solvent. Chlorinated diphenyl is an excellent plasticizer for the purpose.

(D) *Fillers.*

(1) Calcium sulphate.—This filler is incorporated in the plastic compound for the purpose of quickly reacting with the water on the surface on which the plastic is applied, to enable the plasticized binder to secure adhesion.

(2) Portlant cement.—This filler is incorporated in the plastic compound because of its water reactivity and because it serves to strengthen the dried plastic and maintain its water resistance.

(E) *Coloring matter.*—Pigments may be added to the plastic compound as required for the purpose of varying its color. Suitable pigments include titanium dioxide, carbon black, iron oxides, and similar inert and nontoxic materials. For best results, the coloring matter should be limited to not more than twenty percent of the total filler.

The preferred method for preparing this plastic compound is as follows:

The binder is dissolved in the solvent in such proportion as to give a solution with a viscosity of about one and one half poises at twenty-five degrees centigrade. The proper amount of plasticizer is added to give the desired degree of flexibility to the dried plastic. The calcium sulphate and cement, preferably in the proportion of one part of calcium sulphate to three parts of cement, together with the coloring matter if desired, are mixed into the plasticized solution of the binder to form a paste of putty-like consistency.

The following are specimen formulae which have been found to give excellent results:

Example 1

| | Parts by weight |
|---|---|
| Chlorinated rubber | 40 |
| Ethylene dichloride | 75 |
| Carbon tetrachloride | 75 |
| Chlorinated diphenyl | 12 |
| Portland cement | 300 |
| Calcium sulphate | 100 |
| Titanium dioxide | 100 |

The chlorinated rubber preferred in these formulae is sold under the trade name of "Parlon," and should be the twenty centipoise type. The chlorinated diphenyl preferred is sold under the trade name of Arochlor 1254. The chlorinated rubber and the chlorinated diphenyl are dissolved in the mixture of ethylene dichloride and carbon tetrachloride, and the cement, calcium sulphate, and titanium dioxide are worked in to form a paste of puttylike consistency. This plastic composition dries very hard and can be sanded easily.

Example 2

| | Parts by weight |
|---|---|
| Chlorinated rubber | 40 |
| Carbon tetrachloride | 180 |
| Chlorinated diphenyl | 25 |
| Portland cement | 400 |
| Calcium sulphate | 125 |
| Carbon black | 12 |

This formulation yields a plastic which is very effective for sealing leaking aquariums and other water containers. It has excellent adhesion to wet surfaces, sets up very quickly, and dries to a hard surface in less than twenty-four hours, even in a very thick film.

*Example 3*

| | Parts by weight |
|---|---|
| Chlorinated rubber | 40 |
| Ethylene dichloride | 80 |
| Carbon tetrachloride | 80 |
| Chlorinated diphenyl | 75 |
| Portland cement | 400 |
| Calcium sulphate | 125 |
| Iron oxide | 100 |

This formulation yields a plastic which combines unusual permanent elasticity with extreme waterproofness. It can be used for cementing joints where uneven expansion occurs, for example, a joint between glass and metal.

It should be understood that the proportions of ingredients as set forth in these examples may be varied within relatively wide limits without departing from the spirit of the invention.

I claim:

1. The plastic composition of matter of puttylike consistency which is capable of adherence to wet solid surfaces and which dries and hardens on exposure to air and which is composed chiefly of calcium sulphate and Portland cement, in the proportion of about one part of calcium sulphate to about three parts of cement, admixed with a solution consisting of chlorinated rubber plasticized with chlorinated diphenyl, dissolved in a compatible solvent or mixture of solvents with a high rate of evaporation, said chlorinated rubber and said chlorinated diphenyl being present in sufficient quantity to bind the calcium sulphate and Portland cement to form a firm plastic after the evaporation of the solvent.

2. The plastic composition of matter which is capable of adherence to wet solid surfaces and which dries and hardens on exposure to air and which is composed chiefly of calcium sulphate and Portland cement, in the proportions of about one part of calcium sulphate to about three parts of cement, admixed so as to form a homogeneous plastic compound of puttylike consistency with a solution consisting of chlorinated rubber plasticized with a suitable water resistant plasticizer, dissolved in a compatible solvent or mixture of solvents with a high rate of evaporation, the proportion of said chlorinated rubber to said solvent being such as to produce a solution with a viscosity of about one and one-half poises at twenty-five degrees centigrade.

3. The plastic composition of matter of puttylike consistency which is capable of adherence to wet solid surfaces and which dries and hardens on exposure to air, and which is composed of:

| | Parts by weight, about |
|---|---|
| Chlorinated rubber | 40 |
| Chlorinated diphenyl | 25 |
| Carbon tetrachloride | 180 |
| Portland cement | 400 |
| Calcium sulphate | 125 |

PHILIP L. GORDON.